United States Patent [19]

Cline et al.

[11] 3,820,806

[45] June 28, 1974

[54] SLED-RAMP

[76] Inventors: Benjamin W. Cline, 308 N. Felts Rd.; Larry D. Prophet, 12109 E. 26th St., both of Spokane, Wash. 99206

[22] Filed: Sept. 15, 1972

[21] Appl. No.: 289,360

[52] U.S. Cl. ................... 280/30, 214/85, 280/12 R, 280/32, 280/24, 280/400
[51] Int. Cl. ............................................. B60p 1/44
[58] Field of Search ............... 280/12 R, 18, 30, 32; D34/15 AK; 214/85

[56] References Cited
UNITED STATES PATENTS

| | | | |
|---|---|---|---|
| 2,735,690 | 2/1956 | Paden et al. | 280/12 R |
| 2,829,902 | 4/1958 | Stocker | 280/18 |
| 3,374,003 | 3/1968 | Fulsom | 280/18 |
| 3,613,920 | 10/1971 | Flamm | 214/85 |
| D181,330 | 10/1957 | Yager | D34/15 AK |
| D190,959 | 7/1961 | Holcomb | D34/15 AK |

FOREIGN PATENTS OR APPLICATIONS

| | | | |
|---|---|---|---|
| 343,238 | 1/1950 | Switzerland | 280/18 |

*Primary Examiner*—Leo Friaglia
*Attorney, Agent, or Firm*—Clarence A. O'Brien; Harvey B. Jacobson

[57] ABSTRACT

A sled construction including a deck and opposite side depending longitudinal runners. The deck includes front and rear ends and the forward end thereof curves upwardly through an arc of decreasing radius and slightly more than 90°. The sled includes opposite side upwardly projecting longitudinal side walls which are slightly forwardly and upwardly inclined and terminate at their forward ends in forwardly and upwardly angulated surfaces inclined approximately 45° relative to the deck, the upper extremities of the inclined surfaces being disposed at least closely adjacent the upper extremity of the forwardly and upwardly curving forward end of the deck. The upwardly curving forward end of the deck functions to plane the sled over snow behind a towing vehicle such as a snowmobile and the sled may be inverted with the free end of the curved forward end portion of the deck and the angulated forward extremities of the sides hooked over the bumper of a load vehicle such as a pickup truck to thus enable a snowmobile to be advanced forwardly up over the inverted sled onto the load bed of the pickup truck with the inverted sled functioning as a ramp and the runners extending along the opposite sides of the ramp defining curbs to prevent a snowmobile from slipping sideways off the ramp defined by the inverted sled.

7 Claims, 7 Drawing Figures

PATENTED JUN 28 1974

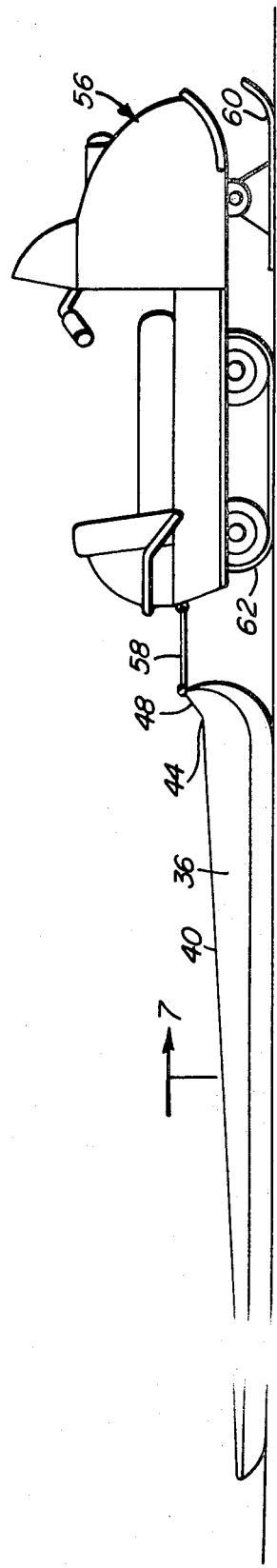
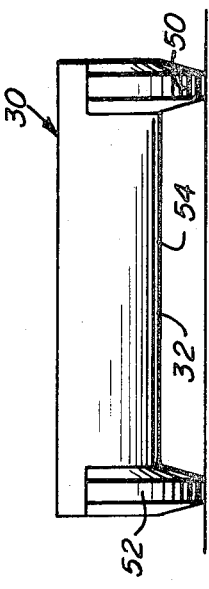
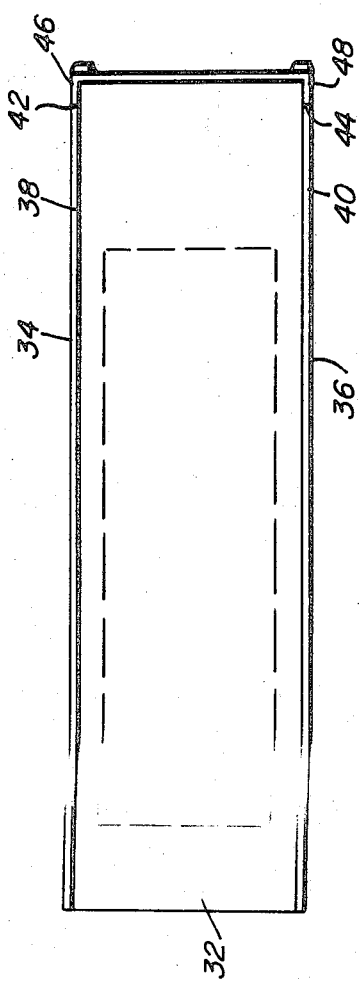
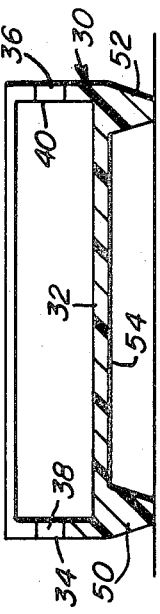

SLED-RAMP

The instant invention has been primarily designed to provide a dual function apparatus which may be utilized in the first instance as a load sled to be pulled behind a snowmobile and in the second instance to be utilized as a loading ramp for loading a snowmobile on the raised load bed of a truck type vehicle.

The combined sled and ramp structure may be of one-piece construction with fiber glass presently considered as the most desirable material of which to construct the combined sled and ramp so as to provide an apparatus that is strong and durable, light weight and sufficiently smooth to offer little resistance when being utilized as a sled.

The main object of this invention is to provide a combined sled and ramp structure for use in towing behind a snowmobile and also as a ramp, when inverted, to facilitate the loading of a snowmobile on the load bed of a vehicle.

Still another object of this invention is to provide a combined sled and ramp in accordance with the preceding object and including opposite side longitudinal runners for proper tracking in snow when being towed behind a snowmobile and of a transverse cross-sectional shape so as to function in a superior manner as curbs along the opposite sides of the loading ramp defined by the sled when inverted.

Another important object of this invention is to provide a sled having a forwardly and upwardly curving front end for facilitating the planing action of the sled over snow and yet constructed in a manner so as to define an efficient hook for hooking over the rear bumper of a load bed equipped vehicle when the sled is inverted and to be used as a loading ramp.

An ancillary object of this invention, in accordance with the two preceding objects is to provide a combined sled and ramp structure including depending opposite side runners and upstanding opposite sides for functioning in the manner of longitudinal reinforcing members.

A final object of this invention to be specifically enumerated herein is to provide a combined sled and ramp structure in accordance with the preceding objects and which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 1 is a fragmentary side elevational view of a conventional form of pickup truck with parts thereof being broken away and illustrated in longitudinal vertical section and with the combined sled and ramp of the instant invention in inverted position and operatively associated with the rear of the pickup truck so as to define a loading ramp by which a smowmobile may be moved up onto the load bed of the pickup truck;

FIG. 4 is a side elevational view illustrating the sled and ramp combination in an upright position utilized as a sled being pulled behind a snowmobile;

FIG. 5 is a top plan view of the combined sled and ramp;

FIG. 6 is a front elevational view of the combined sled and ramp; and

FIG. 7 is an enlarged transverse vertical sectional view taken substantially upon the plane indicated by the section line 7—7 of FIG. 4.

Figure 1:
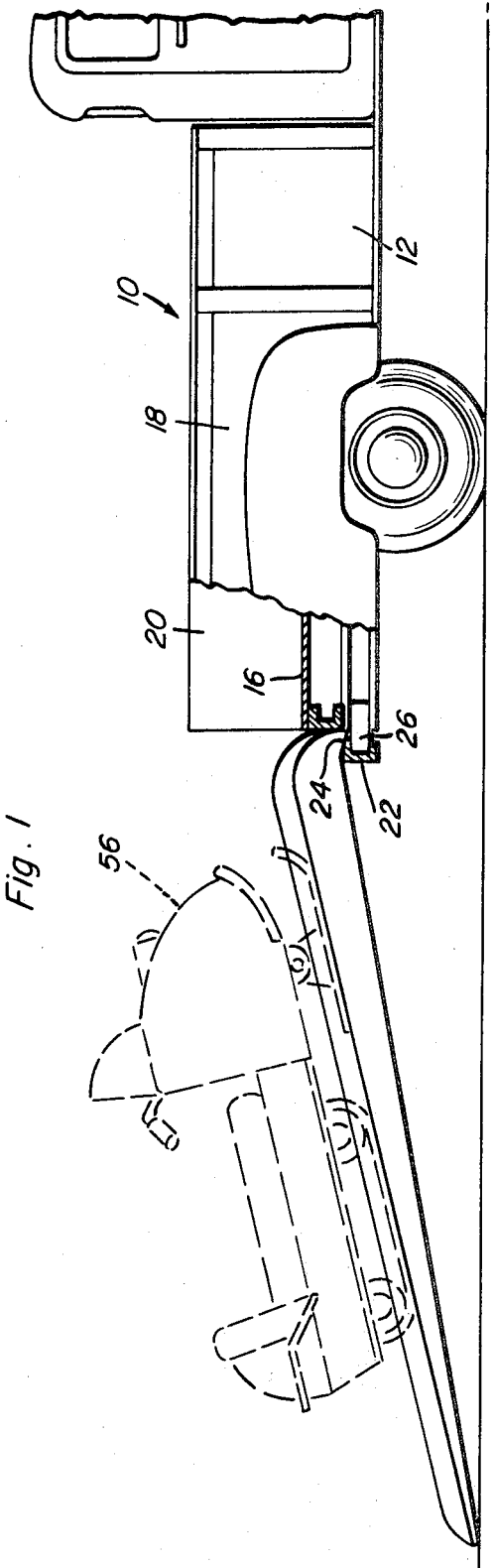

Referring now more specifically to the drawings, the numeral 10 generally designates a conventional form of pickup truck including a step side body 12 defining a load bed 16 between a pair of opposite side walls 18 and 20. The pickup truck 10 further includes a rear transverse horizontal bumper 22 spaced slightly to the rear and below the rear end of the load bed 16 with a shallow transverse upwardly opening channel 24 being defined between the bumper 22, the rear end of the load bed 16 and above the bumper support arms 26.

The combined sled and ramp of the instant invention is referred to in general by the reference numeral 30 and includes a generally horizontal deck or flooring 32 which curves forwardly and upwardly at its front end through an arc of decreasing radius and slightly more than 90°. The combined sled and ramp 30 further includes upstanding longitudinally extending side walls 34 and 36. The side walls 34 and 36 include slightly forwardly and upwardly inclined upper edges 38 and 40 and accordingly, the height of the side walls 34 and 36 above the decking or flooring 32 gradually increases from a height of approximately 1 inch adjacent the rear end of the decking 32 to a height of approximately 6¼ inches above the decking 32 at the points 42 and 44 at which the upper edges 38 and 40 are angulated more sharply upwardly at approximately 45° as at 46 and 48 to merge with the opposite ends of the upward extremity of the forwardly and upwardly curving forward end of the deck or flooring 32.

The opposite sides of the decking or flooring 32 additionally include depending opposite side runners 50 and 52 which extend the full length of the decking 32. The rear ends of the runners 50 and 52 curve upwardly to the bottom surface 54 of the decking 32 and the forward ends of the runners 50 and 52 curve forwardly and upwardly through arcs of decreasing radius to merge with the upper extremity of the forwardly and upwardly curving forward end portion of the decking 32. The runners 50 and 52 are inverted isosceles trapezoidal in cross-sectional shape wherein the opposite sides of the runners 50 and 52 are downwardly convergent.

Figure 3:
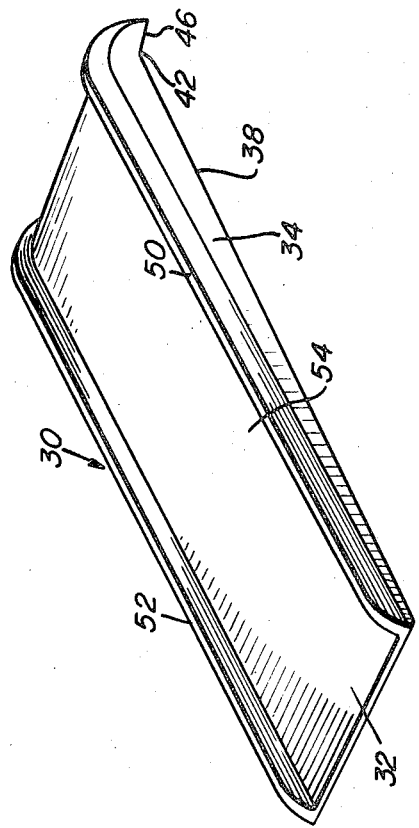
FIG. 3 is a view of the combined sled and ramp of the instant invention in an inverted ramp defining position.
Figure 2:
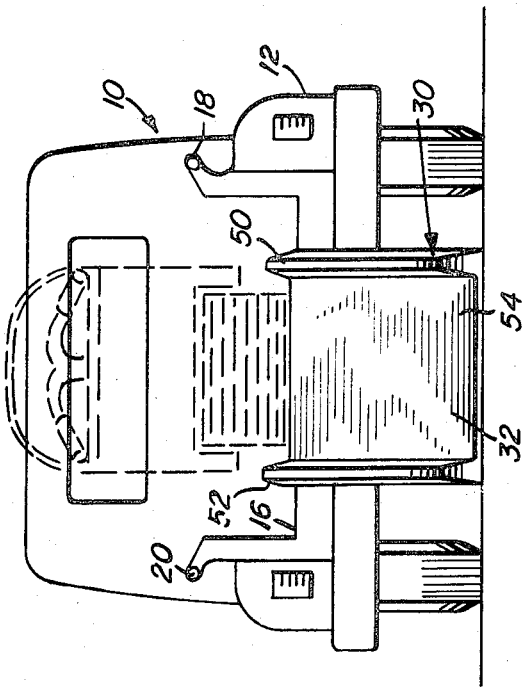
FIG. 2 is a rear elevational view of the assembly illustrated in FIG. 1 but with a snowmobile in loaded position on the load bed of the pickup truck illustrated in phantom lines.

From FIG. 4 of the drawings it may be seen that the combined sled and ramp 30, when disposed in an upright position, may be towed behind a snowmobile such as that generally referred to by the reference numeral 56 by means of a tow line or cable 58 connected between the rear of the snowmobile 56 and the uppermost extremity of the forward end of the combined sled and ramp 30. Also, when it is desired to load the snowmobile 56 onto the load bed 16 of the pickup truck 10, the combined sled and ramp 30 is inverted in the manner illustrated in FIGS. 1 and 3 of the drawings and the forward end thereof is hooked over the bumper 22 with the inverted structure 30 being supported from the bumper 22 by the angulated surfaces 46 and 48. In this manner, downward pressure on the inverted structure 30 will ensure its hooked engagement with the bumper 22 and the structure 30 may be utilized as a ramp along which the snowmobile may be driven in order to load the snowmobile onto the load bed 16. It will be noted that the runners 50 and 52, when the structure 30 is inverted and utilized as a ramp, define curbs between which to receive the front skis 60 and the rear endless track assembly 62 of the snowmobile 56. The inclined sides of the runners 50 and 52 will prevent the skis 60 or the endless track assembly 62 from climbing up and over the curbs.

The structure 30 is preferably constructed of fiber glass and of one-piece construction whereby an extremely light, durable and high strength component is provided. Further, the utilization of fiber glass in the construction of the assembly 30 ensures smooth undersurface portions to assist in gliding the assembly 30 over the snow when it is in an upright position.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A combined loading ramp and sled structure, said structure comprising an elongated deck including front and rear ends, the front end of said deck being curved forwardly and upwardly, the opposite longitudinal sides of said deck including depending runners extending substantially the full length of said deck and curving forwardly and upwardly at the forward end of the deck, the opposite longitudinal sides of said deck also including upstanding longitudinally extending sides, the upper edges of said upstanding sides being generally horizontal rearward of the forward extremity of said deck, but rearwardly and downwardly inclined relative to the upper surface of the deck and terminating adjacent their rear ends at an elevation spaced only slightly above said deck, the forward extremities of the generally horizontal upper edges of said sides being angled upwardly and terminating adjacent the forward and upper extremity of the forwardly and upwardly inclined forward end of the deck, the rear portions of the upper and lower surfaces of said deck between said sides and runners, respectively, being longitudinally straight and generally parallel to the rear marginal edge of said deck.

2. The combination of claim 1 wherein said runners include longitudinal inner side edges that are downwardly divergent and which define upwardly divergent edges when said deck is inverted.

3. The combination of claim 2 wherein the outer side surfaces of said runners are downwardly convergent.

4. The combination of claim 1 wherein said deck, runners and sides are of one-piece construction so as to enable said runners and sides to comprise opposite side reinforcing members for said deck to increase the load carrying capacity thereof.

5. The combination of claim 4 wherein said deck, runners and sides are constructed of fiber glass.

6. The combination of claim 5 wherein said runners include longitudinal inner side edges that are downwardly divergent and which define upwardly divergent edges when said deck is inverted.

7. The combination of claim 6 wherein the outer side surfaces of said runners are downwardly convergent.

* * * * *